No. 620,421. Patented Feb. 28, 1899.
J. C. COX.
PLOW.
(Application filed Apr. 7, 1898.)
(No Model.)
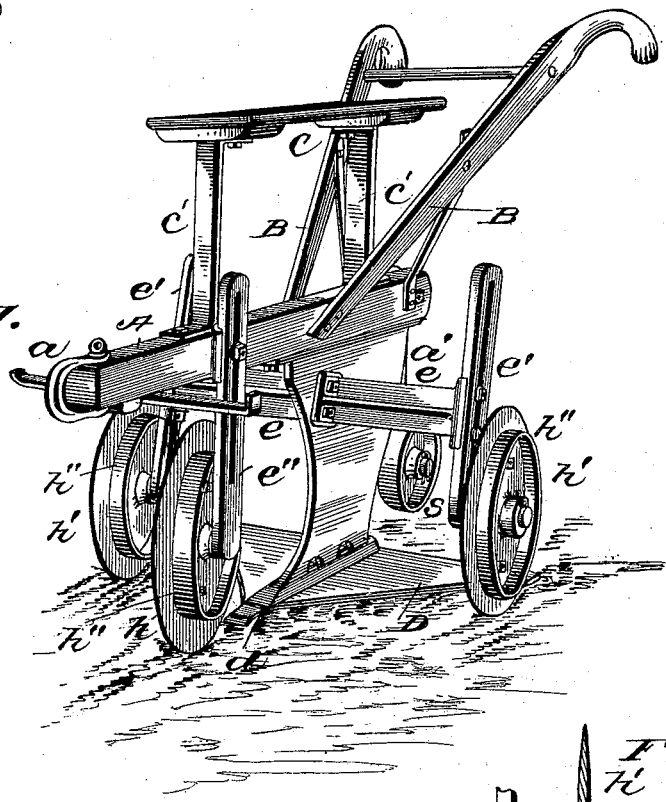
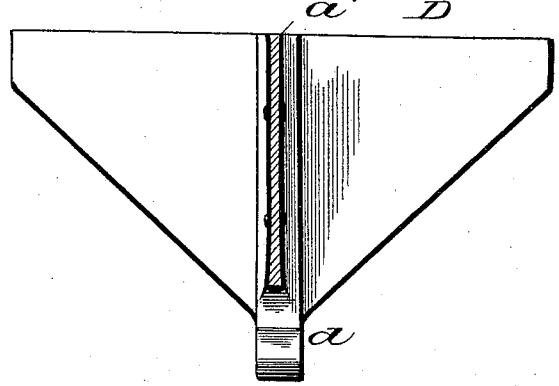
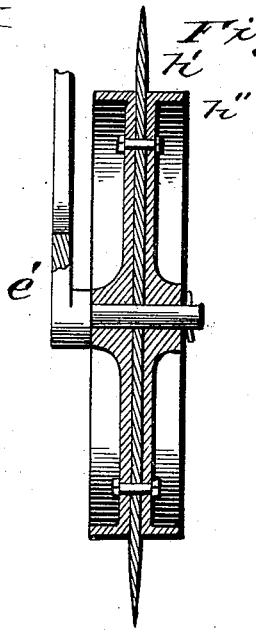

UNITED STATES PATENT OFFICE.

JOHN C. COX, OF ELYRIA, OHIO.

PLOW.

SPECIFICATION forming part of Letters Patent No. 620,421, dated February 28, 1899.

Application filed April 7, 1898. Serial No. 676,725. (No model.)

*To all whom it may concern:*

Be it known that I, JOHN C. COX, a citizen of the United States, residing at Elyria, in the county of Lorain and State of Ohio, have invented a new and useful Plow for Cultivation of the Soil and other Purposes, of which the following is a specification.

My invention relates to improvements in tools or plows for cleaning out the weeds and plants in strawberry-beds and the like and making clean spaces or rows through the beds of strawberry-plants and the like and for cutting sods.

The object of my invention is to provide a tool or plow that will make a clean space and of uniform width as often as desired and only slightly disturb the surface of the soil, also cut off the runners and trim the edges of the rows of plants, also that can be adjusted to cut any desired reasonable depth and of uniform width in cutting sods. I attain these objects by means of the mechanism illustrated in the accompanying drawings, of which—

Figure 1 is a perspective view of my invention, showing the relationship and construction of the parts; Fig. 2, a plow or top view of cutting-blade; Fig. 3, a broken sectional view of cutting-blade, and Fig. 4 a vertical sectional view of rolling colter and side flanges.

Similar letters refer to similar parts throughout the several views.

The beam is represented by A, which may be of any desired size and shape, to which are attached handles B B of ordinary shape and size.

C represents a seat elevated and resting on two supports $c'$ $c'$, secured to the upper side of the beam A. An ordinary clevis $a$ is attached to front end of the beam A. To the under side of the beam A and back of its center is attached and rigidly secured the standard $a'$. This standard $a'$ preferably is made thin and wide and slightly concaved vertically, in front, of the general form shown in the drawings, but any other suitable shape may be used. To the lower end of the standard $a'$ is rigidly secured a shoe or cutting-blade D, near its center and of a length equal to the width of the distance desired to be cleaned between rows of strawberry or other plants, preferably about two feet. This cutting-blade D is provided with a point $d$ in the center, projecting forward, and from which point $d$ the edges recede backward toward the outer ends of the cutting-blade, thereby D forming a cutting and shearing edge.

Rigidly secured to the standard $a'$ are laterally-projecting arms $e$ $e$, to the outer ends of which laterally-projecting arms are secured the side adjustable rolling-colter standards $e'$ $e'$, and also to the beam A is attached a central rolling-colter standard $e''$. The lateral arms $e$ $e$ may be of the form and attached in the manner shown in the drawings or of any other form and shape and otherwise attached that will hold the colters in place. To the adjustable colter-standards $e'$ $e'$ are attached the side rolling colters $h'$ $h'$, provided with side flanges $h''$ $h''$ of suitable size to prevent the side rolling colters cutting deeper than up to said flanges. To the central colter-standard $e''$ is attached the central rolling colter $h$. To the rear end of the beam A is attached a supporting-wheel S to prevent the machine from tipping up too far in front and assist in keeping the machine steady in use.

The operation of my machine is as follows, to wit: The front central colter makes a central cut which permits the soil to more easily divide when it strikes the standard $a'$, and by adjusting the height of this central colter any angle within reasonable limits may be given to the blade D which will cause said blade D to enter the ground more or less, as desired. The flanges $h''$ $h''$ $h''$ on the sides of the disks prevent same cutting into the ground to any greater depth than the same, and thereby help keep the blade D at uniform depth. The side colters $h'$ $h'$ are adjusted so that the blade D will run at the desired depth when the colters cut down to the side flanges on same, and the side flanges prevent the cutting-blade from running any deeper than the point to which they are adjusted. The cutting-blade in being drawn forward then shears or cuts off all weeds, plants, and roots at the depth to which it is adjusted between said side colters, and the soil, plants, weeds, and roots pass over the top of the cutting-blade and are deposited in the rear of same with very little disturbance of the soil and without throwing any of the soil, weeds, plants, or roots over onto the uncultivated parts. Further, the side colters trim the edges of the rows and gently press the earth down along said edge by means of the outer flanges on said colters. The operator can ride or walk, as desired, and the handles can be used at ends of rows in turning around or otherwise, as desired.

In cutting sods the side colters are adjusted at such a point as will permit the cutting-blade D to run underneath the roots of the grass and make the sods of proper thickness. The rolling colters cut the edges and make the strips of uniform width, and the cutting-blade D runs underneath, cutting same loose, leaving same in long strips, which can be rolled up and cross-cut, as may be desired, into suitable lengths.

Having fully described my invention and its operation, what I claim as new, and desire to secure by Letters Patent of the United States, is—

1. In a cultivator and sod-cutter the beam A provided with a standard $d'$ secured to the center of a flat horizontal cutting-blade D, in combination with adjustable side colters $h'\ h'$ provided with side flanges $h''\ h''$, all as above set forth and substantially as described.

2. In a cultivator and sod-cutter laterally-projecting arms with rolling colters attached and secured thereto by adjustable standards, in combination with a horizontal cutting-blade centrally secured to an upright standard, all as above set forth and substantially as described.

3. In a cultivator and sod-cutter laterally-projecting arms $e\ e$ provided with adjustable rolling colters $h$ provided with side flanges $h''\ h''$ in combination with a flat obtusely-pointed cutting-blade D with edges receding rearwardly each side of the center all as above set forth and substantially as described.

JOHN C. COX.

Witnesses:
J. C. CONAWAY,
MABEL COPAS.